United States Patent
Mamidi et al.

(10) Patent No.: US 10,599,618 B2
(45) Date of Patent: *Mar. 24, 2020

(54) NAMESPACE PERFORMANCE ACCELERATION BY SELECTIVE SSD CACHING

(71) Applicant: EMC IP Holding Company LLC, Hopkinton, MA (US)

(72) Inventors: Murthy Mamidi, San Jose, CA (US); George Mathew, Belmont, CA (US); Pengju Shang, Milpitas, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,365

(22) Filed: Jan. 31, 2019

(65) Prior Publication Data

US 2019/0179802 A1 Jun. 13, 2019

Related U.S. Application Data

(63) Continuation of application No. 15/281,711, filed on Sep. 30, 2016, now Pat. No. 10,235,378.

(51) Int. Cl.
*G06F 12/08* (2016.01)
*G06F 16/172* (2019.01)
(Continued)

(52) U.S. Cl.
CPC ........ *G06F 16/172* (2019.01); *G06F 12/0866* (2013.01); *G06F 12/0888* (2013.01); *G06F 16/164* (2019.01); *G06F 16/182* (2019.01); *G06F 2212/1024* (2013.01); *G06F 2212/1044* (2013.01); *G06F 2212/1056* (2013.01); *G06F 2212/154* (2013.01); *G06F 2212/163* (2013.01); *G06F 2212/214* (2013.01); *G06F 2212/222* (2013.01); *G06F 2212/2515* (2013.01); *G06F 2212/263* (2013.01); *G06F 2212/313* (2013.01);
(Continued)

(58) Field of Classification Search
CPC .... G06F 12/08; G06F 12/0866; G06F 16/172; G06F 16/182; G06F 16/164
USPC ........................................................ 711/102
See application file for complete search history.

(56) References Cited

U.S. PATENT DOCUMENTS 7,464,386 B2 * 12/2008 Millington .......... G06F 16/9535 719/331
9,235,479 B1    1/2016 Muntz
(Continued)

OTHER PUBLICATIONS

U.S. Appl. No. 15/281,711, filed Sep. 30, 2016, Mamidi et al.
(Continued)

*Primary Examiner* — Pierre Miche Bataille
(74) *Attorney, Agent, or Firm* — Workman Nydegger (57) ABSTRACT

In one example, a method includes receiving metadata in the form of a modification to metadata represented by a file system namespace abstraction, and the file system namespace abstraction corresponds to less than the entire file system namespace. Next, the file system namespace abstraction is updated based on the received metadata. Next, a determination is made whether or not caching is enabled for the file system namespace abstraction. If caching is enabled for the file system namespace abstraction, the updated file system namespace abstraction is cached in SSD storage.

15 Claims, 5 Drawing Sheets

(51) Int. Cl.
*G06F 12/0866* (2016.01)
*G06F 16/16* (2019.01)
*G06F 16/182* (2019.01)
*G06F 12/0888* (2016.01)

(52) U.S. Cl.
CPC .............. *G06F 2212/466* (2013.01); *G06F 2212/7205* (2013.01)

(56) References Cited

U.S. PATENT DOCUMENTS

| | | |
|---|---|---|
| 9,582,421 B1 | 2/2017 | Agarwala |
| 9,798,736 B2 | 10/2017 | Sirianni |
| 10,019,459 B1 | 7/2018 | Agarwala |
| 10,057,273 B1* | 8/2018 | Chakraborty ............ G06F 21/31 |
| 2002/0133809 A1* | 9/2002 | Hills .................... G06F 9/4488 717/136 |
| 2013/0058384 A1 | 3/2013 | Otis |
| 2013/0276137 A1* | 10/2013 | Hinton .................... G06F 21/62 726/27 |
| 2013/0339309 A1 | 12/2013 | Sirianni |
| 2014/0297734 A1* | 10/2014 | Lacapra .............. H04L 67/1097 709/203 |
| 2015/0281360 A1 | 10/2015 | Lacapra |
| 2016/0112513 A1* | 4/2016 | CaraDonna ......... H04L 67/1097 709/214 |

OTHER PUBLICATIONS

U.S. Appl. No. 15/281,711, dated Jun. 14, 2018, Office Action.
U.S. Appl. No. 15/281,711, dated Jan. 3, 2019, Notice of Allowance.

* cited by examiner

FIG. 5

NAMESPACE PERFORMANCE ACCELERATION BY SELECTIVE SSD CACHING

RELATED APPLICATIONS

This application is a continuation of, and hereby claims priority to, U.S. patent application Ser. No. 15/281,711, entitled NAMESPACE PERFORMANCE ACCELERATION BY SELECTIVE SSD CACHING, filed Sep. 30, 2016. All of the aforementioned applications are incorporated herein in their respective entireties by this reference.

FIELD OF THE INVENTION

Embodiments of the present invention generally concern caching metadata. More particularly, at least some embodiments of the invention relate to systems, hardware, computer-readable media, and methods directed to namespace performance acceleration by selective solid state device (SSD) caching of namespace metadata.

BACKGROUND

Entities typically generate and use data that is important in some way to their operations. This data can include, for example, business data, financial data, and personnel data. If this data were lost or compromised, the entity may realize significant adverse financial and other consequences. Accordingly, entities typically back up their important data so as to create a backup that can later be used in a data restore process if necessary.

A variety of backup and archive systems have been developed for use in the reliable retention of data. While such systems have generally proven effective, they nonetheless suffer from various shortcomings, some of which relate to the file system, and particularly, the file system namespace. In particular, in some storage systems, a directory manager acts as the repository for the file system namespace. As such, the directory manager relies on deduplication and storage mechanisms in other layers of the storage system to persist the namespace in a physical storage layer. As well, when it comes to providing namespace services like file creation and file look up for upper layers such as the file system, the directory manager may likewise rely on the same underlying layers. As a result of arrangements such as that just described, the directory manager must contend for resources, such as input/output operations per second (IOPs) and memory, with the rest of the services involving the file system, where such services include data ingestion and garbage collection for example.

In view of problems such as those noted above, it would be useful to be able to carry out the necessary namespace operations without requiring resort to lower layers, such as hard disk storage, in the storage system.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern caching metadata. More particularly, at least some embodiments of the invention relate to systems, hardware, computer-readable media, and methods directed to namespace performance acceleration by selective solid state device (SSD) caching of namespace metadata.

Embodiments of the invention can be employed in a variety of environments, including any storage environment having a file system namespace. Thus, some example operating environments for embodiments of the invention include the EMC Corp. Data Domain storage systems. Storage system environments for embodiments of the invention can include a variety of logical and physical system layers. For example, at least some storage environments include layers such as: namespaces, which can be protocol-specific; file system directories, files and snapshots; segment or block collection in containers; and, physical disk storage. Part, or all, of the storage environment can be a cloud storage environment, although that is not required. Alternatively, part, or all, of the storage environment can reside on-premises at an enterprise.

In general, embodiments of the invention involve caching metadata, that is, the file system namespace, in Solid State Devices (SSD), thus enabling the elimination of the lower layer(s), which may be in the form of, or include, hard disk storage, from the path of namespace operations. As noted below however, the lower layer storage may nonetheless be employed in some embodiments of the invention. In more detail, a directory manager can divide the namespace into manageable objects called MTrees. Each MTree represents a part of the file system namespace, which can be a part of a Data Domain file system (DDFS) namespace for example, that can be independently exported and managed.

The MTrees are each stored as a flattened Btree, and the Btrees are further divided into fixed sized chunks referred to herein as pages. Each page holds a given part of the namespace corresponding to a set of user files in the MTree. Whenever any files get created/modified/deleted, the corresponding page of the namespace will be brought into a directory manager page cache, and modified and written down to storage via lower layers in the file system. While the modified page makes its way to storage, it is cached in SSD as well. Thus, some embodiments of the invention can employ lower layer hard disk storage in addition to SSD storage, although the lower layer hard disk storage is not employed in the path of namespace operations. As the older generation pages expire due to overwrites, periodic defragmentation will copy forward sparse SSD blocks to avoid write amplification.

SSD storage may be relatively expensive however, and its limited capacity is shared for a variety of different purposes. Thus, the SSD space is used only for selected portions of the namespace. The remainder of the SSD space is conserved for other uses. Accordingly, embodiments of the invention enable selective caching, in the SSD space, of the file system namespace.

A. Example Operating Environments

In general, embodiments of the invention may include and/or be implemented in an operating environment that includes various systems and devices that generate data that is backed up and archived. The operating environment can include a data storage system that serves to store data for disaster recovery purposes, and also stores data in a long term retention facility, such as cloud storage for example. Any of the computing devices in the operating environment can be physical machines or virtual machines (VM), though neither type of machine is required for any embodiment.

As used herein, the term 'data' is intended to be broad in scope and embraces, by way of example and not limitation, data segments such as may be produced by data stream segmentation processes, data chunks, data blocks, atomic data, emails, objects of any type, files, contacts, directories, volumes, and any group of one or more of the foregoing.

In at least some embodiments, the storage system of the operating environment comprises, or consists of, the EMC Corp. Data Domain deduplication storage system. However, the scope of the invention is not limited to that example storage system. Data sources for the Data Domain environment, and other environments disclosed herein, include, but are not limited to databases and database servers, email servers, virtual machines (VM), file shares/servers, and enterprise applications. Such environments also present a variety of backup use cases including, but not limited to, database, mainframe, IBMi, EMC Corp. Big Data, file/ email, VMware, Network Attached Storage (NAS), and Remote Office Branch Office (ROBO). As well, example archive use cases include, but are not limited to, file/email, EMC Corp. Big Data, VMs, content management, storage tiering, databases, and database servers. The backed up data can form part of a disaster recovery (DR) system and/or a long term retention system and can be stored on-premises and/or remotely, such as at one or more cloud locations for example.

Figure 1:
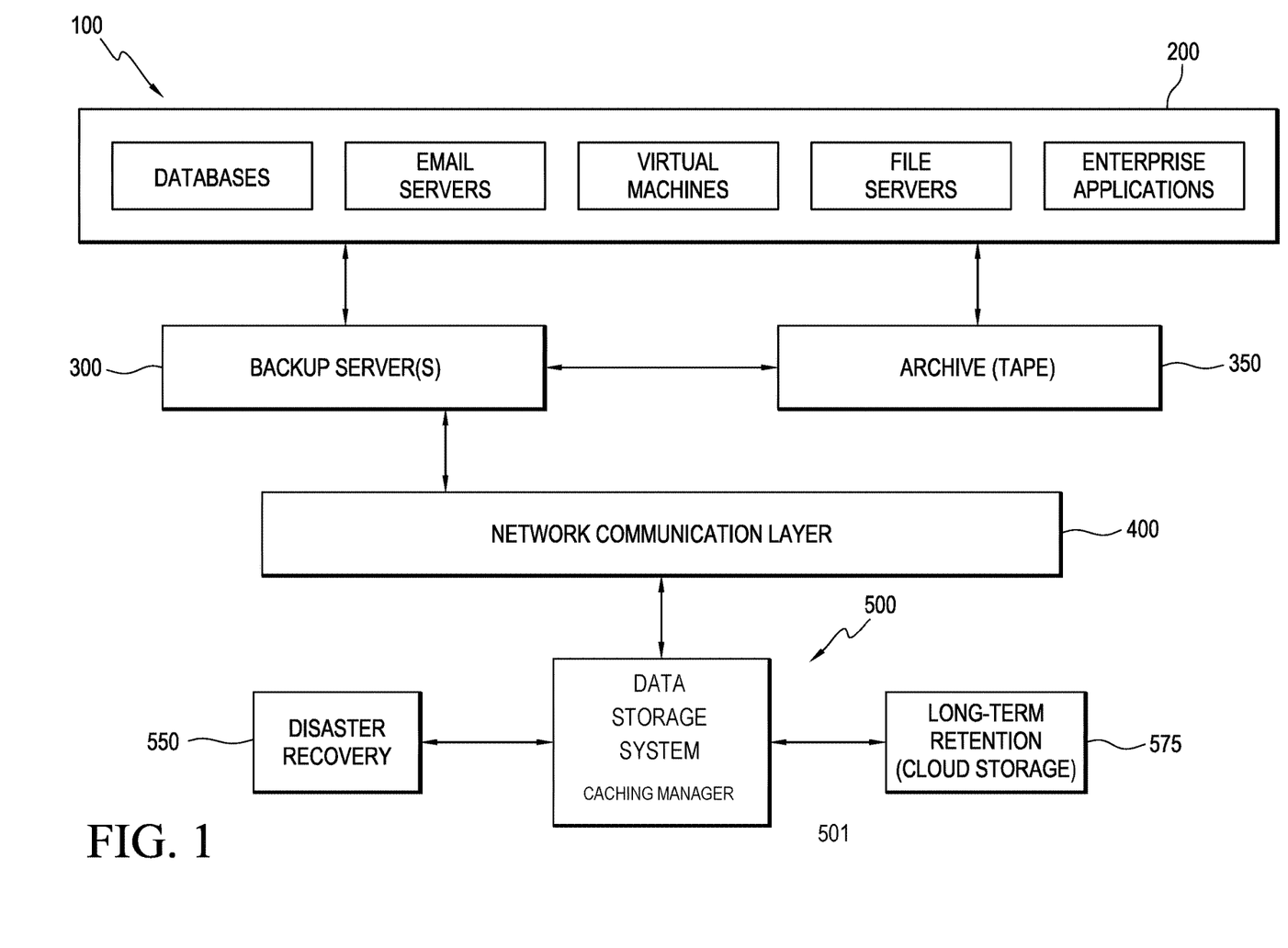
FIG. 1 discloses aspects of various example operating environments for at least some embodiments.

With the foregoing in mind, attention is directed now to FIG. 1 which discloses one example of an operating environment that may be suitable for one or more embodiments of the invention. In FIG. 1, the example operating environment is denoted at 100 and may comprise, or consist of, a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computing devices that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a variety of data sources 200 that can be hosted by one or more clients, servers or other devices. Such data sources 200 can include, for example, databases, email servers, virtual machines, file servers, and enterprise applications. In general, the data sources create and modify data that can be backed up, stored, and retrieved. Accordingly, the operating environment 100 further includes one or more backup servers 300 that communicate with one or more archives 350. In some embodiments, the archives 350 can provide for tape backup, although any other media can alternatively be employed. The backup servers 300, which can be an EMC Corp. Avamar server or NetWorker server for example, can cooperate with the client devices that host the data sources 200 to create data backups for storage. For example, the backup servers 300 can communicate, by way of a network communication layer 400, with a data storage system 500. Examples of a data storage system 500 include any of the EMC Corp. Data Domain deduplication storage systems, although the scope of the invention is not limited to such examples. As further indicated in FIG. 1, the data storage system 500 can store backups from the backup servers 300 in a disaster recovery system 550 and/or a long term retention system 575. The stored backups can be retrieved and restored to one or more target devices, such as a device that hosts a data source 200.

The data storage system 500 can include a caching manager 501 that is operable to perform any of the methods disclosed herein, including methods for selective SSD caching. The caching manager 501 can take the form, for example, of an application that resides on a data storage system 500 server. The caching manager can perform selective SSD caching automatically based upon, for example, a weighting scheme, examples of which are discussed below. As well, operational parameters, including weights to be assigned to different users or tenants, can be input by a user to the caching manager 501 by way of a user interface.

Figure 2:
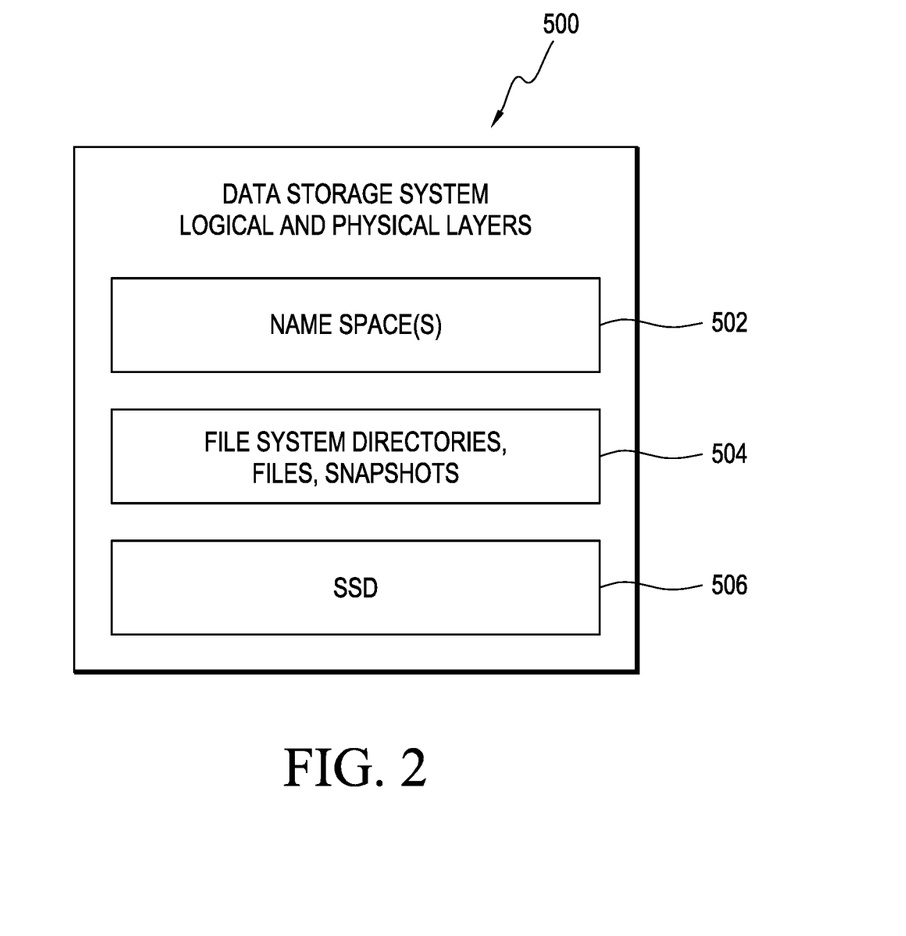
FIG. 2 discloses aspects of an example configuration of a data storage system.

With attention now to FIG. 2, further details are provided concerning the example data storage system 500. As indicated, the data storage system 500 can include various logical and physical layers. In particular, the example data storage system 500 includes a first logical layer 502 with one or more file system namespaces. A second logical layer 504 includes file system directories, files, and snapshots, for example. Finally, the example data storage system 500 can include a physical storage layer 506 in the form of one or more solid state memory devices (SSD). In this example, the logical layers 502 and 504 include metadata, and the physical storage layer 506 includes data with which the metadata is associated. In the illustrated configuration, the logical layers 502 and 504 may be referred to as upper layers, while the physical storage layer 506 may be referred to as a lower layer.

B. Example Layer Configuration—SSD Caching

Figure 3:
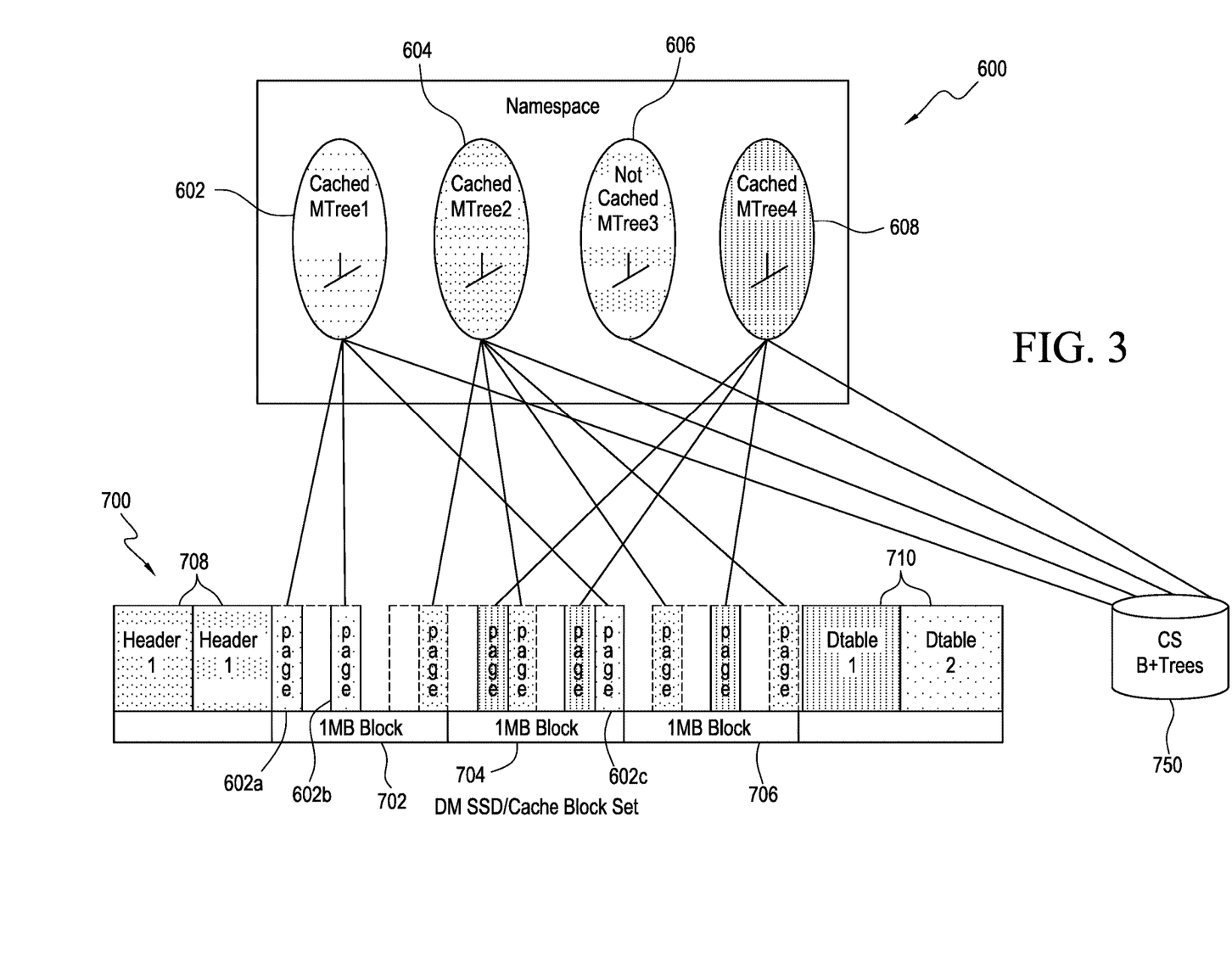
FIG. 3 discloses aspects of an example configuration of a namespace and associated SSD storage.

With the forgoing discussion of FIGS. 1 and 2 in view, and directing attention now to FIG. 3 as well, further details are provided concerning an example namespace 600 and SSD 700 configuration. In some embodiments, a directory manager serves as a repository of the namespace 600. As shown, the namespace 600 can be divided into one or more logical partitions such as Mtrees 602, 604, 606 and 608 that can be independently exported and managed, for example, by the directory manager. Thus, each MTree is a representation, or abstraction, of a respective part of the file system namespace. Moreover, operations can be performed on each Mtree individually. In at least some embodiments, an Mtree can be stored as a flattened binary tree, or Btree, data structure. Depending on various considerations, and as discussed in more detail below, an Mtree may or may not be cached in SSD storage. For example, Mtrees 602, 604 and 608 are cached, while Mtree 606 is not cached.

As further indicated, each Btree can be further divided into fixed sized chunks called pages. In general, whenever any file is created/modified/deleted, the corresponding page of the namespace will be brought into the directory manager page cache, and is then modified to reflect the file change(s) and written down to storage by way of the lower layers in the file system. As the page makes its way to storage, the same namespace is cached in SSD also. As the older generation pages expire due to overwrites, periodic defragmentation can copy forward sparse SSD blocks to avoid write amplification.

In more detail, each page holds a given part of the namespace that corresponds to a set of user files in the MTree. By way of illustration, the Btree to which Mtree 602 corresponds includes pages 602a, 602b and 602c. As indicated, the pages of a Btree need not all be parts of the same memory block of the SSD 700. Thus, for example, pages 602a and 602b are part of block 702, while page 602c is part of block 706. It should be noted that a set of blocks, such as block 702, 704 and 706, can be collectively referred to as forming a cache block set. The SSD 700 can also include headers 708 that precede the blocks, as well as one or more Dtables 710 that follow the blocks. In general, the status of cached blocks is maintained in the Dtables 710. In particular, each Dtable 710 entry can include information about a block of a segment such as, for example, the size and offset of the block. As such, a Dtable serves as a directory table of blocks, that is, metadata about the blocks themselves.

With continued reference to FIG. 3, the MTree based namespace abstractions 602 . . . 608 provide a convenient way to selectively cache only selected parts of the namespace 600. Because each Mtree can be managed individually, caching of the Mtree in SSD 700 can be enabled/disabled on a per-MTree basis at any time and, when enabled, the namespace portion pertaining to a particular MTree from then on will be cached in SSD storage, in the form of pages as described above, unless or until the caching of that namespace portion is later disabled. As well, one, some, or all, of the flattened Btrees to which the respective Mtrees correspond can be stored in a separate database 750, although that is not necessarily required and can be omitted. Where a flattened Btree is stored only in the database 750, namespace operations concerning that flattened Btree may run considerably slower than in embodiments of the invention, in which that flattened Btree is additionally, or alternatively, cached in SSD storage.

As noted above, caching of the various Mtrees of the namespace 600 can be implemented on a per-Mtree basis. Thus, in some instances at least, one or more Mtrees can be designated, or re-designated, as the case may be, such that the designated Mtree(s) is/are not cached in SSD 700. In the illustrated example, the Mtree 606 has been designated such that it is not cached in SSD 700. As this example thus illustrates, portions of the namespace can be selectively cached to SSD 700.

In the case where an Mtree is disabled for caching, or is deleted for some reason, an SSD defragmentation mechanism can be initiated to throw away the cached pages corresponding to the disabled MTree by copying only the other live pages forward. The level of caching can also be apportioned by specific allocation of a defined portion of SSD storage to a given MTree. This can be implemented in connection with the defragmentation cycles. In particular, a defragmentation process can count the live pages for each MTree as the defragmentation process sweeps the SSD cached namespace. Then, only the live pages are copied forward, that is, retained in SSD.

More specifically, by evaluating time stamps in the page headers, the defragmentation process can implement a coarsely grained aging mechanism by dropping live, but aged, pages instead of copying all of them forward. Though there could be times when a given MTree may cross its SSD cache space limits, over a period of time, the steady state space reclamation by defragmentation process may even out the space allocations.

Whether or not a portion of a namespace is cached can be based on a variety of considerations. In general however, caching can be employed in order to make efficient use of relatively expensive, and scarce, SSD storage that is in demand by other applications and processes.

In more detail, and by way of example, quality of service (QoS) considerations can be used as a basis for making determinations as to how, and how much, SSD storage will be allocated for namespace caching. For example, in a multi-tenant storage environment, different tenants, or customers, can have different service level agreements (SLA) with the storage provider and/or different respective data access patterns and needs. Thus, a high paying and/or on-line user may want, and need, faster namespace response than a relatively low-paying and/or archive user. In such a case, the latter user may not need SSD support, and caching could be disabled for the namespace(s) of that user. As well, when circumstances such as access patterns, ISP pricing model, user scenarios, and technology change, namespace caching can be enabled again. Thus, caching of namespaces in SSD can be performed in connection with a weighting scheme that favors caching in some circumstances, such as in the example of the on-line user noted above, and disfavors caching in other circumstances, such as in the example of the archive user noted above.

Accordingly, by controlling the SSD space allocation on selective parts of the file system namespace in a weighted manner, as illustrated by the examples above, the directory manager can selectively tune up the performance of random namespace operations on the cached portions of the namespace. In this way, a storage servicer provider, for example, can effectively provide quality of service (QoS) based on differentiation in a multi-tenant storage environments.

As well, the ability of embodiments of the invention to provide for selective caching of namespaces, or portions of namespaces, on-demand provides significant flexibility in terms of responding to user needs and responding to changes that may impact the operating environment. This selective caching also helps to improve the use of SSD by facilitating caching only of the namespaces that require it, while disabling caching when it is not needed.

C. Example Host Configuration

Figure 4:
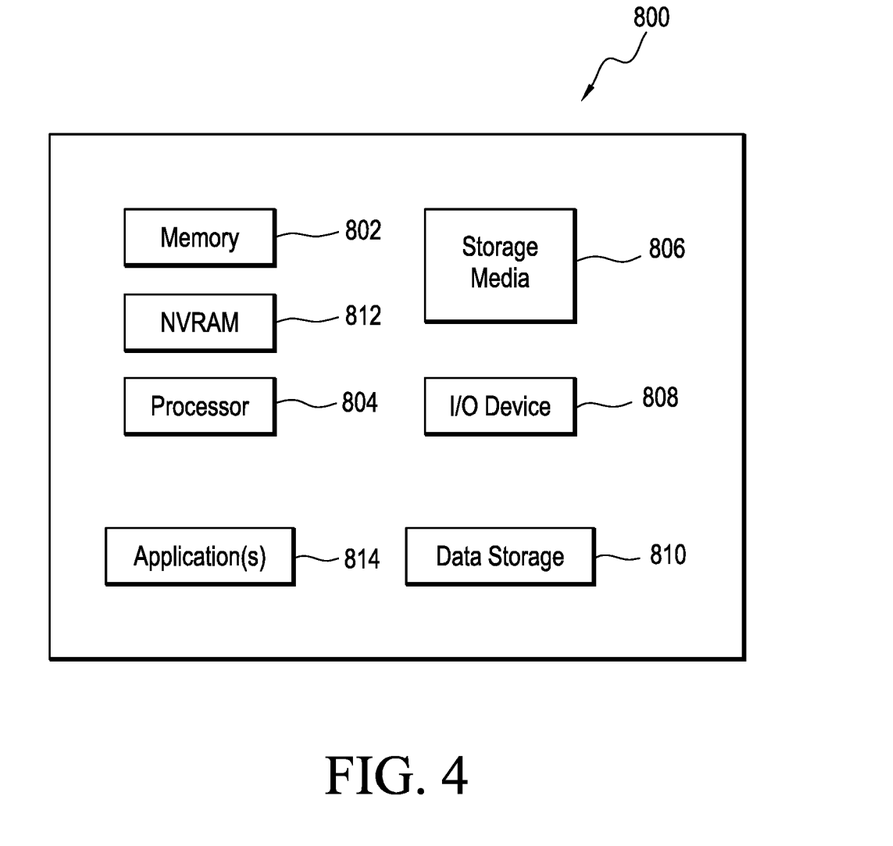
FIG. 4 is a discloses aspects of an example host configuration.

With reference briefly to FIG. 4, one or more of the data sources 200 and associated clients, backup server 300, data storage system 500, caching manager 501, disaster recovery system 550, and long term retention system 575, can take the form of a physical computing device, one example of which is denoted at 800. In the example of FIG. 4, the physical computing device 800 includes a memory 802 which can include one, some, or all, of random access memory (RAM), non-volatile random access memory (NVRAM) 812, read-only memory (ROM), and persistent memory, one or more hardware processors 804, non-transitory storage media 806, I/O device 808, and data storage 810. One or more of the memory components of the physical computing device can take the form of solid state device (SSD) storage. As well, one or more applications 814 are provided that comprise executable instructions. Such executable instructions can take the form, for example, of one or more of a backup application, a backup client, an archive application, any application that generates and/or modifies data, a data storage application, a caching manager application, and a method for selective caching of data in memory, such as SSD.

D. Aspects Of Example Methods

Figure 5:
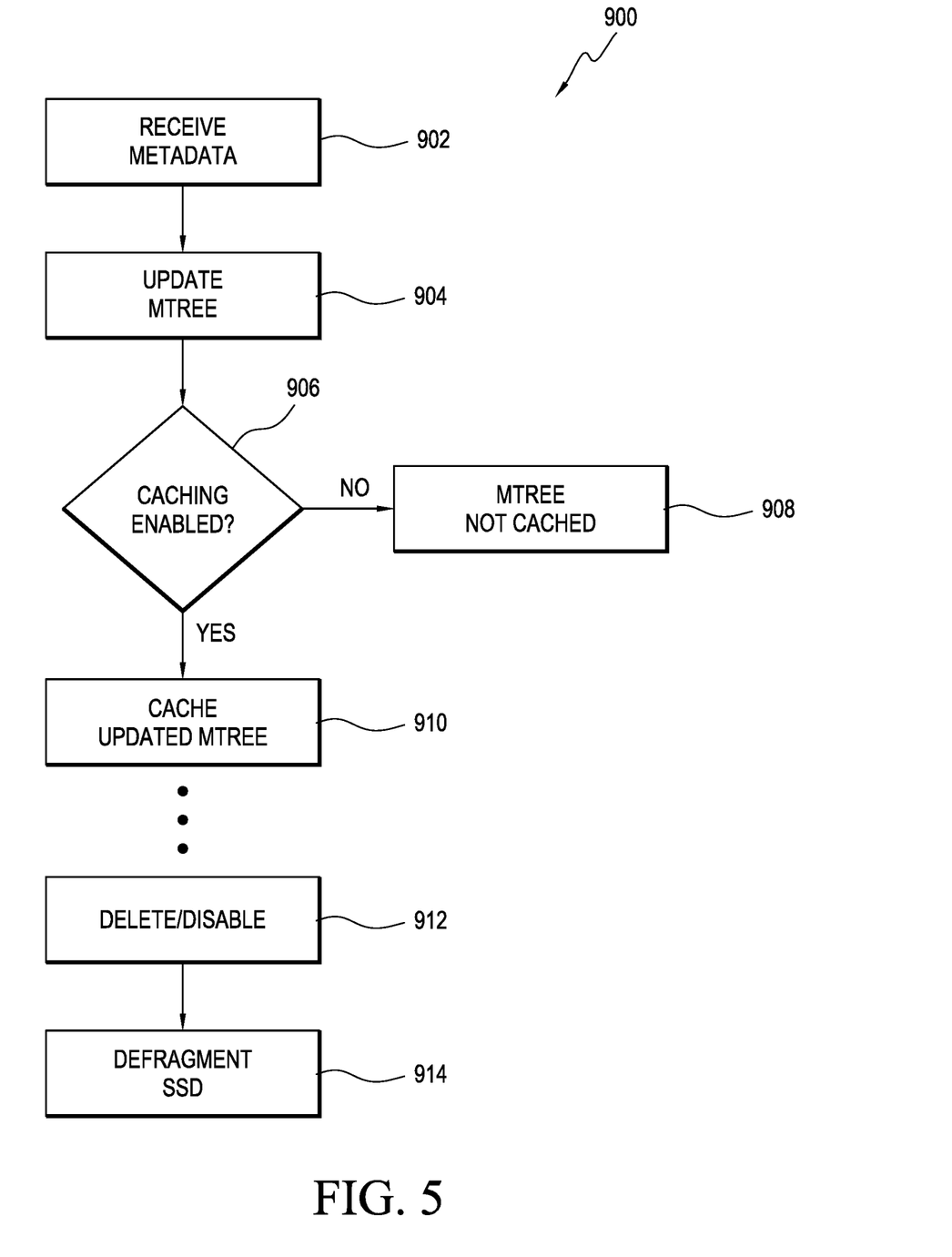
FIG. 5 is a flow diagram that discloses aspects of an example method for selective caching of metadata in storage.

With reference once again to FIGS. 1-3, and directing attention now to FIG. 5 as well, details are provided concerning methods for selective caching of metadata, such as namespace information for example, one example of which is denoted generally at 900. In general, the example method 900 can be performed in whole or in part by a caching manager, for example, that resides on a data storage system. Thus, the method 900 can involve communication between the caching manager and a tenant, or user, of the storage system, and also between the caching manager and SSD storage of a data storage system element such as a server.

The method can begin at 902 when metadata is received, such as from an application for example, that is in the form of a modification to metadata represented by a file system namespace abstraction, which can take the form of an Mtree or flattened Btree. The application that transmits the metadata can be a backup application in some instances.

The file system namespace abstraction to which the received metadata corresponds represents only part, that is, less than all, of the file system. Such metadata may indicate, for example, that the file embraced by the namespace has been created, modified, or deleted. In some instances, the metadata may indicate that the file has been moved from one part of the file system to another part of the file system. Depending on where the file was originally stored, and where it was moved, such a move can implicate a single Mtree, or two different Mtrees. The file can be any type of file that comprises, or consists of, data.

After receipt of the metadata, the file system namespace abstraction to which the received metadata corresponds is then updated 904 based upon the received metadata. For example, an Mtree can be updated to indicate that a file reflected in the Mtree has been created, modified, or deleted for example. Where metadata pertaining to multiple respective files is received, and the metadata pertains to multiple different Mtrees, the associated respective Mtrees for those files can be updated in serial fashion, or in parallel.

Next, the Mtree, or Mtrees, that have been updated are checked 906 to determine if caching has been enabled for that Mtree, or those Mtrees. If caching has not been enabled, the modified Mtrees are not cached 908 in SSD. On the other hand, if caching has been enabled, the modified Mtree(s) is/are cached 910 in SSD. It should be noted that any Mtree can have caching enabled, or disabled, at any time. By caching only Mtrees so designated, embodiments of the invention facilitate efficient use of the SSD.

From time to time, one or more Mtrees may either be disabled for caching or deleted 912. Caching can be disabled for various reasons, such as in the case where an SLA with a particular tenant is modified. For example, if a tenant moves from online data storage access to archive data storage, it may no longer be necessary to cache portions of the filesystem namespace that correspond to that user. Similarly, an Mtree can be deleted for a variety of reasons. For example, if all the files associated with that Mtree are deleted, there is no longer any need to retain the Mtree. As another example, a user may decide to migrate his data to another storage system, such that his files and directories can be deleted, thereby obviating the need to retain the Mtrees(s) that correspond to the data of that user.

In any case, after caching has been disabled for an Mtree, or an Mtree has been deleted, a defragmentation of the SSD can be performed 914. The defragmentation process 914 can discard, from SSD, the cached Mtree(s) corresponding to the deleted Mtree(s) and/or the Mtree(s) for which caching has been disabled.

In addition to discarding cached Mtrees in the case of Mtree deletion and/or Mtree cache disabling, the defragmentation process 914 can also involve counting, in the SSD, live pages for each Mtree and determining if the Mtrees have exceeded their respective SSD cache limits. Where this is determined to be the case, the oldest page or pages, as determined by examination of the time stamps in the page headers, of such Mtrees are discarded from oldest until most recent until the Mtrees are again within their respective SSD cache limits, or with an acceptable range of their cache limits. In some instances, this process may involve the discarding of live pages.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving metadata in the form of a modification to metadata represented by a file system namespace abstraction, wherein the file system namespace abstraction corresponds to less than an entire file system namespace;
   updating the file system namespace abstraction based on the received metadata;
   determining if caching is enabled for the file system namespace abstraction; and
   when caching is enabled for the file system namespace abstraction, caching the updated file system namespace abstraction in SSD storage.

2. The method as recited in claim 1, wherein the file system namespace abstraction is in the form of an Mtree.

3. The method as recited in claim 2, wherein the Mtree is included in a file system namespace that also includes another Mtree for which caching is not enabled.

4. The method as recited in claim 1, wherein when caching is not enabled for the file system namespace abstraction, the updated file system namespace abstraction is not cached in the SSD storage.

5. The method as recited in claim 1, wherein when caching is enabled for the file system namespace abstraction, the updated file system namespace abstraction is cached in SSD storage in the form of a flattened Btree.

6. The method as recited in claim 5, wherein the flattened Btree includes one or more pages.

7. The method as recited in claim 1, wherein the received metadata indicates that a file has been added, modified, or deleted.

8. The method as recited in claim 1, wherein the file system namespace abstraction represents a portion of a file system.

9. The method as recited in claim 1, wherein the file system namespace abstraction is in the form of an Mtree, and further comprising defragmenting the SSD storage by removing cached metadata that corresponds with a deleted Mtree.

10. The method as recited in claim 1, wherein the file system namespace abstraction is in the form of an Mtree, and further comprising allocating a respective specific amount of SSD storage to each of a plurality of Mtrees.

11. The method as recited in claim 1, wherein the file system namespace abstraction is in the form of an Mtree, and the method further comprises disabling caching for the Mtree.

12. The method as recited in claim 11, further comprising performing a defragmentation process by throwing away cached pages corresponding to the disabled Mtree.

13. The method as recited in claim 12, wherein the defragmentation process is performed according to an allocation of SSD storage.

14. The method as recited in claim 12, wherein the defragmentation process is performed based on page header time stamps.

15. The method as recited in claim 1, wherein the file system namespace abstraction is in the form of an Mtree, and the method further comprises controlling allocation of SSD storage to each of a plurality of Mtrees, wherein the allocation is based on a weighting scheme.

* * * * *